Nov. 8, 1932.  A. D. ROBBINS  1,886,837

LOCKING MECHANISM FOR POWER APPORTIONING DEVICES

Filed Dec. 2, 1931

INVENTOR
Azar D. Robbins,
BY Redding, Greeley, O'Shea & Campbell
HIS ATTORNEYS

Patented Nov. 8, 1932

1,886,837

UNITED STATES PATENT OFFICE

AZOR D. ROBBINS, OF HIGHLAND PARK, NEW JERSEY, ASSIGNOR TO INTERNATIONAL MOTOR COMPANY, OF NEW YORK, N. Y., A CORPORATION OF DELAWARE

LOCKING MECHANISM FOR POWER APPORTIONING DEVICES

Application filed December 2, 1931. Serial No. 578,441.

The present invention relates to power apportioning mechanisms and embodies, more specifically, a device for apportioning power between a plurality of elements wherein a means is provided for locking the device to prevent the functioning of the device as an apportioning means.

More particularly, the invention embodies a locking mechanism for power apportioning devices or differential mechanisms of the type wherein a plurality of radially disposed cam tracks are engaged by a plurality of driving wedges, the cam tracks having power apportioned therebetween by such wedges.

Locking mechanisms have heretofore been provided for power apportioning devices of the type now commercially used wherein bevel driving pinions are mounted upon a driving ring for engaging driven bevel gears upon aligned driven shafts. In connection with differential mechanisms of the type recently developed no satisfactory locking mechanism has yet been provided and an object of the present invention is to provide a device for locking differential mechanisms of the type employing spaced radial cam tracks and driving wedges.

A further object of the invention is to provide means whereby the carrier in which driving wedges of a power apportioning or differential mechanism are mounted may be locked to one or more of the driven elements whereby the device ceases to function as an apportioning mechanism.

Further objects, not specifically enumerated above, will be apparent as the invention is described in greater detail in connection with the accompanying drawing, wherein.

Figure 1:
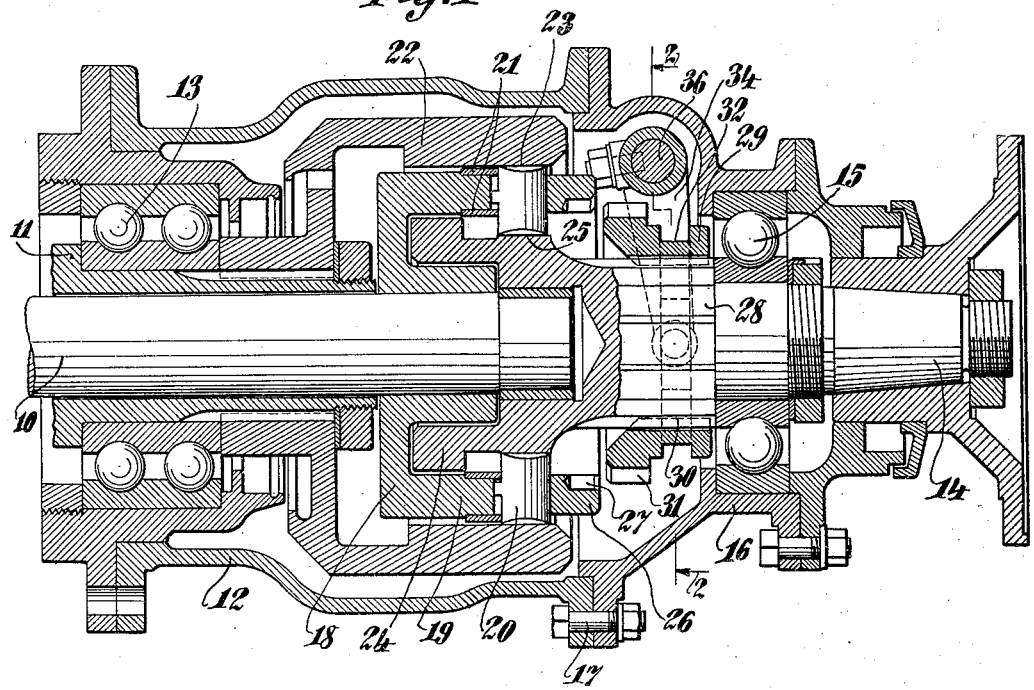
Figure 1 is a view in section, taken through the axis of a power apportioning mechanism constructed in accordance with the present invention.
Figure 2:
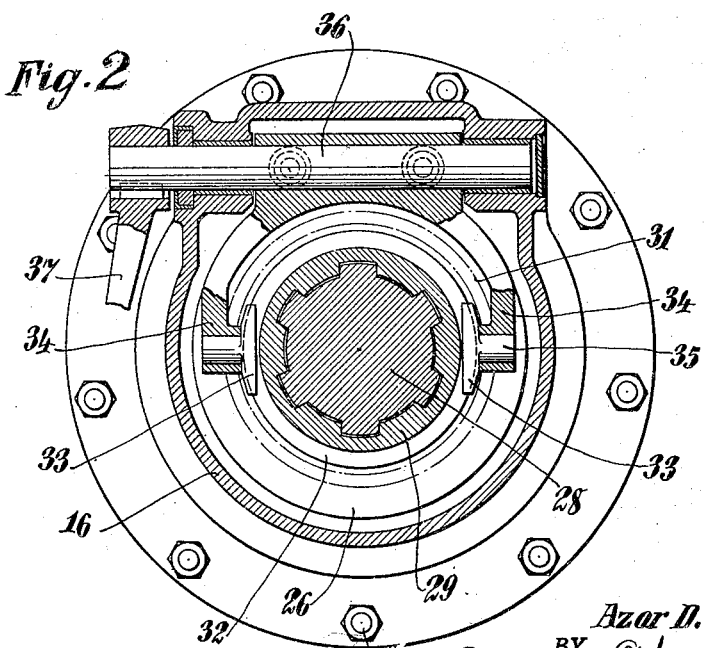
Figure 2 is a view in section, taken on line 2—2 of Figure 1, and looking in the direction of the arrows.

Referring to the above drawing, a driving shaft is shown at 10 and is mounted within a sleeve 11 which is journaled within a housing 12 by bearings 13. The sleeve 11 constitutes one of the driven elements, the other driven element of the mechanism being shaft section 14 which is journaled at 15 within a cover 16, secured at 17 to the housing 12. A carrier 18 is secured to the driving shaft and formed with a cylindrical extension 19 within which a plurality of driving wedges are slidably mounted. Inner and outer annular retaining members 21 are provided to prevent the dislodgment of the wedges 20 and maintain them in a predetermined position with respect to the driven members described hereinafter. Upon the sleeve 11, a cylindrical driven member 22 is mounted, this member being provided with a suitably formed internal cam track 23 against which the outer extremities of the driving wedges engage. The shaft section 14 is formed with a hub 24 upon which a cam track 25 is formed, the inner surface of the wedges 20 engaging the cam track 25. The foregoing structure corresponds to the form of differential or power apportioning mechanism recently designed by applicant and constitutes no part of the present invention.

The cylindrical member 19 is formed with an extension 26 within which spaced grooves 27 are formed. Upon the hub 24 a splined section 28 is formed, a sleeve or clutch member 29 being slidably mounted thereon and formed with keys 30 for engaging the grooves of the splined section 28. The movable clutch member 29 is formed with radial teeth 31 which engage grooves 27 and thus prevent relative movement between the shaft 10 and shaft 14.

A circumferential groove 32 is formed in the clutch 29 and is engaged by fingers 33 which are mounted upon a yoke 34 by trunnion bearings 35. The yoke 34 is keyed to a clutch operating shaft 36 upon which a lever 37 is secured, movement of shaft 36 thus effecting the operation of the clutch 29.

It will thus be seen that, upon engagement of teeth 31 with grooves 27, driving element 10 is locked to driven element 14. In view of the fact that movement of the wedges 20 is prevented in a plane perpendicular to the axis of the shafts 10 and 14, the cylindrical member 22 is thus prevented from movement with respect to shaft 10 and the entire mechanism is thus effectively locked.

While the invention has been described with specific reference to the accompanying drawing, it is not to be limited, save as defined in the appended claim.

I claim as my invention:

In combination with concentric radially spaced driven members, a driving member spaced radially therebetween, means to apportion power between the driven members, a clutch slidable axially on one of the driven members, and interengaging teeth on the clutch and the driving member.

This specification signed this 28th day of Nov. A. D. 1931.

AZOR D. ROBBINS.